United States Patent [19]

Murphy

[11] 4,404,081
[45] Sep. 13, 1983

[54] PHOTOELECTRODIALYTIC CELL

[76] Inventor: George W. Murphy, 2328 Ashwood, Norman, Okla. 73069

[73] Assignee: The United States of America as represented by the U.S. Department of Energy, Washington, D.C.

[21] Appl. No.: 292,852

[22] Filed: Aug. 14, 1981

[51] Int. Cl.³ .......................... C25B 9/00; B01D 13/02
[52] U.S. Cl. ..................................... 204/253; 204/301
[58] Field of Search ................ 204/301, 151, 98, 128, 204/253

[56] References Cited

U.S. PATENT DOCUMENTS 3,438,879 4/1969 Kircher ................................. 264/98
3,725,233 4/1973 Smith ................................... 204/301

OTHER PUBLICATIONS

Savchinko et al., "Applied Solar Energy" vol. 14, No. 3, pp. 45-50 (1978).

Primary Examiner—John F. Niebling
Attorney, Agent, or Firm—Paul A. Gottlieb; Bruce R. Mansfield; Richard G. Besha

[57] ABSTRACT

A multicompartment photoelectrodialytic demineralization cell is provided with a buffer compartment interposed between the product compartment and a compartment containing an electrolyte solution. Semipermeable membranes separate the buffer compartment from the product and electrolyte compartments. The buffer compartment is flushed to prevent leakage of the electrolyte compartment from entering the product compartment.

2 Claims, 3 Drawing Figures

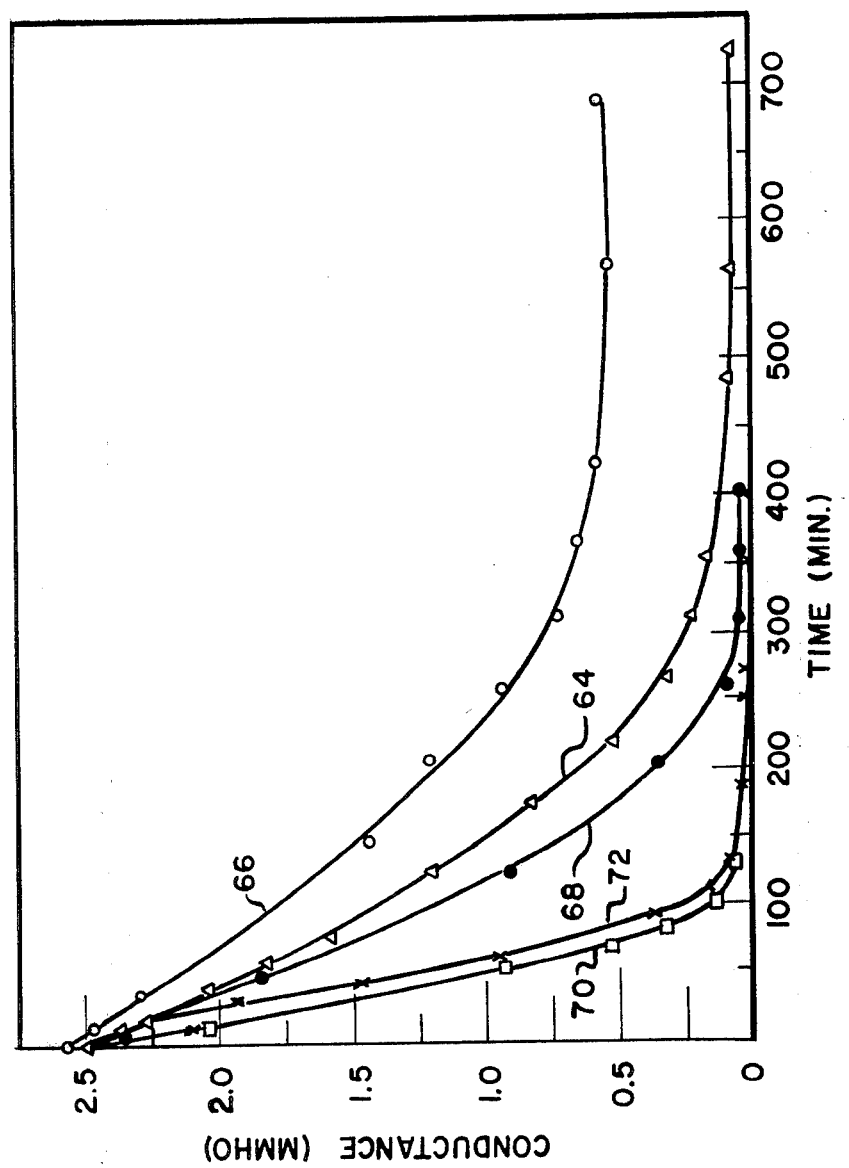

PHOTOELECTRODIALYTIC CELL

CONTRACTUAL ORIGIN OF THE INVENTION

The U.S. Government has rights in this invention pursuant to Contract No. EG-77-C-01-4042 between the U.S. Department of Energy and the Solar Energy Research Institute.

BACKGROUND OF THE INVENTION

The problem of the world's supply of fresh water (less than 500 ppm of dissolved salts) has become acute in recent years. Apart from collecting fresh water (which ultimately arises from rainfall) attempts are being made today to process water reclaimed from sewage and to remove dissolved salts from ocean water and brackish water (water having about 15% the dissolved salt content of ocean water. Of all secondary sources of fresh water, ocean water is the most abundant, and brackish water, which is available in large quantities, is more economically processed than ocean water. Several methods for desalination are in use today: distillation (which is an energy intensive process); freezing (which suffers from entrapment of salt water between ice crystals); reverse osmosis (an energy intensive process requiring high operating pressures), and electrodialysis. This latter method essentially an electrically-driven dialytic separating process in which a three-compartment vessel is formed with two semipermeable membranes defining an inner and two outer compartments. Of the two semipermeable membranes, one is permeable only to cations and the other is permeable only to anions. A positive and a negative electrode are placed in the outer compartments. Initially, all three compartments are filled with salt water in which the salt is dissociated into cations and anions. When a potential difference is impressed across the electrodes, the cations migrate through cation permeable membranes and the anions migrate through anion permeable membranes under the impressed electric field. As a result, a depletion of salt is experienced in the central compartment with an attendant salt enrichment in the outer cells. In urban areas, the electric field is supplied from local electric power generation facilities. But in remote areas, in which electric power generation is not available, electrodialytic cells are preferably energized by photovoltaic devices. Desalination devices which incorporate both photovoltaic and electrodialytic functions in a single cell have been described by G. W. Murphy, inventor of the present invention, in *Solar Energy*, Vol. 21, pp. 403–407 (1978). Such arrangements offer increased efficiency in operation and reduced construction and operation costs. In such arrangements, a photovoltaic member, usually in sheet form is immersed in the electrolyte solution to comprise the electrodes referred to above. Problems encountered in such photoelectrodialytic desalination arrangements include: chemical stability of the photovoltaic members in the electrolyte solution; toxicity levels of the electrolyte solutions and the risk of leakage into the product (fresh) water compartment; development of efficient semipermeable membranes; and overall conversion efficiency of the arrangment. Of great concern however, is the face that the semipermeable membranes are not impervious to toxic electrolyte ions, and that leakage of these ions into the product chamber has been observed to seriously degrade the quality of the product water and the extend of demineralization.

It is therefore an object of the present invention to provide a photoelectrodialytic cell having improved demineralization performance.

It is another object of the present invention to provide a photoelectrodialytic cell having improved protection of the product compartment from inleakage of toxic or otherwise harmful materials.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

These and other objects of the present invention are achieved by providing a multicompartment phototelectrodialytic demineralization cell having a liquid junction photocell. The demineralization cell includes compartments defined by semipermeable membranes, for the liquid junction photocell, a product undergoing demineralization, a component undergoing mineral enrichment (which may or may not include the liquid junction photocell), and a buffer component. The buffer compartment adjoins the product compartment, so as to prevent leakage of neighboring compartments or other contamination from entering into the product compartment. The buffer compartment is flushed at a rate sufficient to preclude migration of contaminating foreign material into the product compartment.

In a specific aspect of the invention, a four compartment photoelectrodialytic desalination cell is provided with a fifth buffer compartment to prevent leakage of toxic electrolyte ions into the product water compartment. The cell includes a liquid junction photocell comprising a solid photoelectric semiconductor bounded on either surface by an electrolyte or redox couple solution. Adjacent a first redox couple compartment is a salt enrichment compartment filled with salt water of the type to be demineralized. Adjoining the salt enrichment cell is the product water compartment, which in turn is adjoined by the second redox couple compartment. Inserted between the product water compartment and the second redox couple compartment is a buffer compartment which accepts ions leaking from the second redox couple compartment. The salt enrichment and buffer compartments are both filled with NaCl of the same type as that initially introduced into the water product compartment for subsequent demineralization. The salt enrichment and buffer compartments are continually flushed during desalination of the product water.

BRIEF DESCRIPTION OF THE DRAWINGS

FIG. 3 shows diagrams of experimental data taken during operation of the cell of FIG. 2.

DETAILED DESCRIPTION OF THE PREFERRED EMBODIMENT

Figure 1:
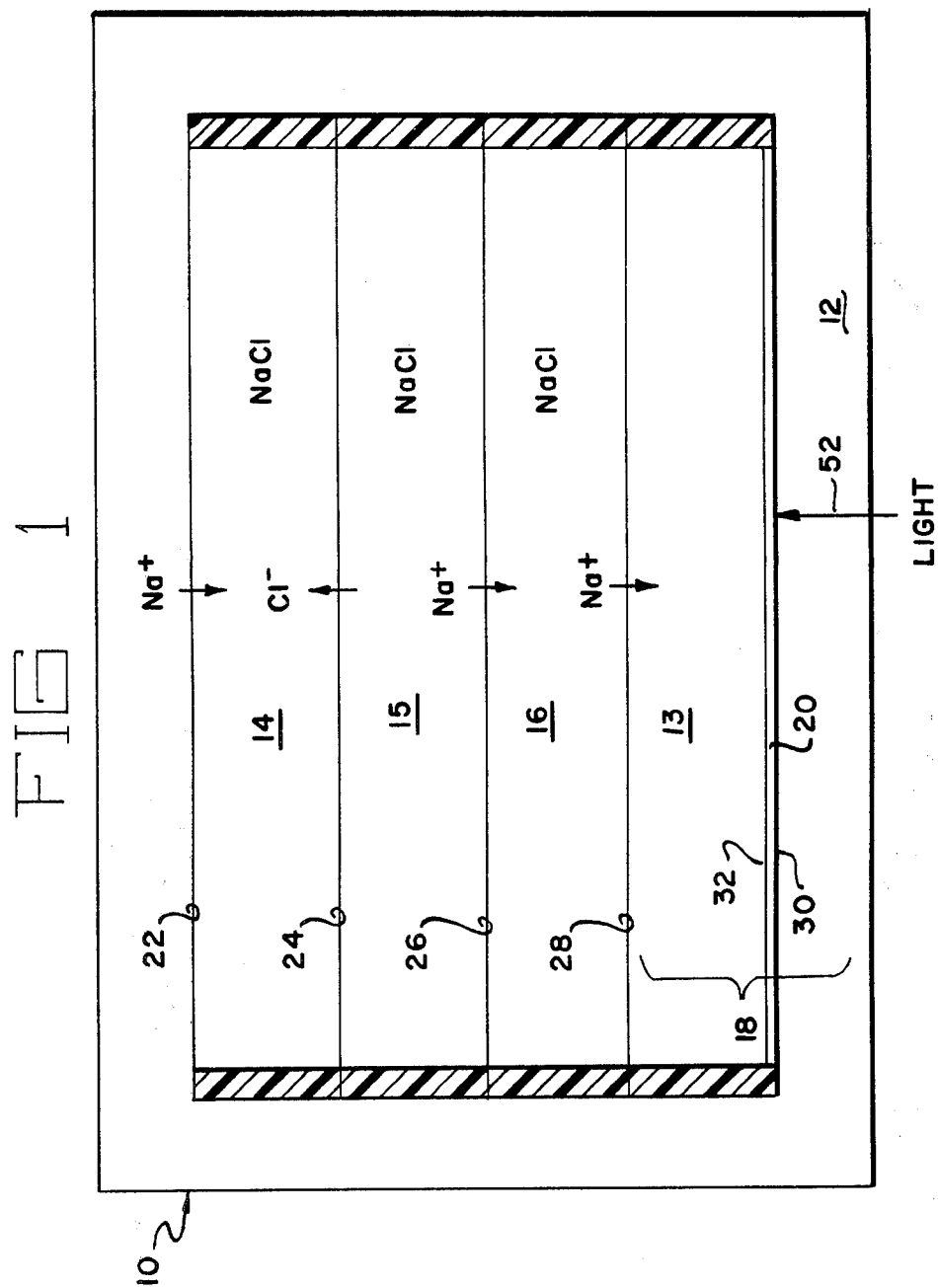
FIG. 1 is a diagrammatic representation of a desalination cell according to the invention.

Referring now to the drawings and especially to FIG. 1, a diagrammatic representation of a desalination cell 10 is shown comprising five compartments 12–16. A liquid junction photocell 18 is comprised of photovoltaic member 20 and adjoining electrolyte or redox couple compartments 12, 13. Adjoining redox couple compartment 12 is salt enrichment compartment 14.

A cation semipermeable membrane 22 separates compartments 12, 14. Adjoining compartment 14 is salt depletion or product water compartment 15 which is separated from compartment 14 by an anion semipermeable membrane 24. A buffer compartment 16 is interposed between compartments 13, 15 and is separated therefrom by cation semipermeable membranes 26, 28 respectively. Compartments 14, 15, 16 are filled with salt water.

Figure 2:
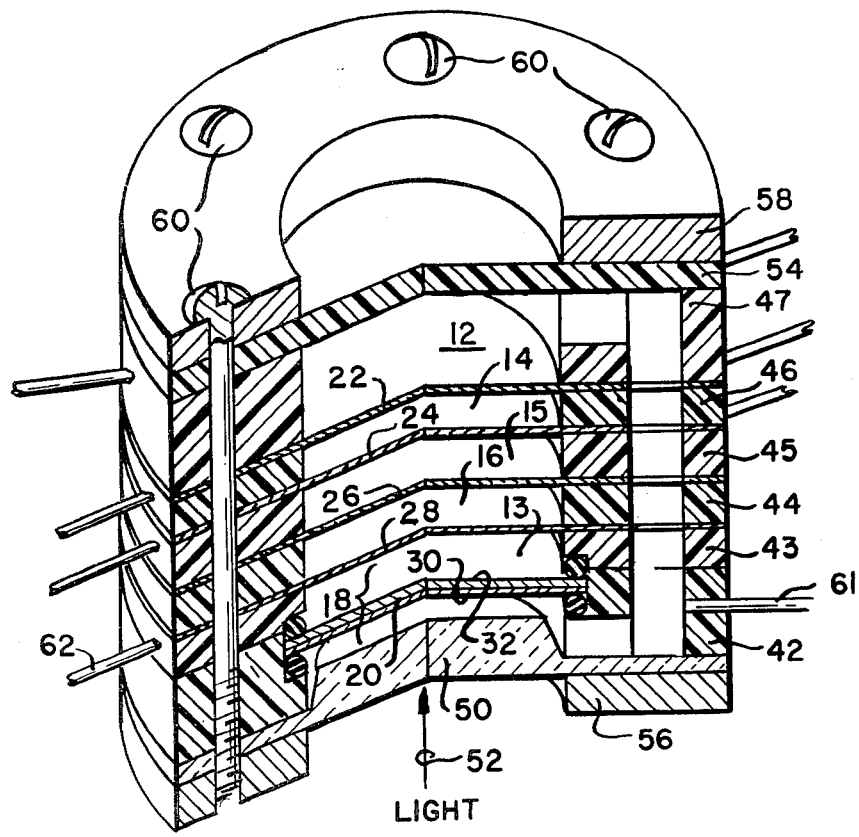
FIG. 2 is a perspective view of a desalination cell constructed according to the invention.

Photovoltaic member 20 is comprised of solid photovoltaic semiconductor plate 30 and metallic counterelectrode 32. When plate 30 is irradiated with sunlight, a potential gradient ie established between plates 30, 32 which in turn establishes an electric field across product compartment 15, as well as the other compartments. Under both photochemical and dialytic influences of cell 10, the $Na^+$ and $Cl^-$ ions migrate out of compartment 15, thus desalinating the product water in that compartment. The sodium ions migrate through the cation permeable membranes 26, 28 to reach compartment 13 where they balance the anion's negative charge which is increased due to the reaction with counterelectrode 32. The sodium selenide solution in compartment 13 is pumped (with a pump not shown in FIG. 1) to compartment 12, and replaced with solution from compartment 12 at a separate intake point. The sodium ions thereafter migrate through cation permeable membrane 22 into compartment 14 where they are restrained from further migration by anion semipermeable membrane 24. The chlorine ions in compartment 15 migrate to compartment 14 through anion semipermeable membrane 24 where cation semipermeable membrane 22 prevents their further migration. The sodium and chlorine ions migrating into compartment 14 combine therein to form salt which enriches the salt concentration of compartment 14. Compartment 14 is flushed periodically when the net concentration rises beyond levels necessary for efficient demineralization of compartment 15. Electrolyte ions are present in compartment 13, in addition to sodium ions. Any electrolyte ions which leak through membrane 28 are prevented from entering compartment 15, since these ions will enter buffer compartment 16 which is flushed at a rate sufficient to prevent migration and subsequent buildup of electrolyte ions at membrane 26. Referring now to FIG. 2, a working cell corresponding to the arrangement of FIG. 1 is shown having reference numerals applied to corresponding members. Cell 10 comprises a housing 40 of six clear acrylic discs 42–47, each 2-1/4" O.D. and 1.0" I.D. An acrylic light tube 50 was cemented to end disc 42 to serve as a window for light entering cell 10 in the direction of arrow 52. An acrylic plate 54 was cemented to the other end disc 47 to form a water-tight enclosure. Stainless steel end plates 56, 58 and screws 60 hold the acrylic plates and discs together in a water-tight manner. Compartment 12 was formed by directing 6 holes through discs 42–47 to form passageways between end portions of cell 10.

Photovoltaic member 20 took on two different arrangements. In a first arrangement, photovoltaic electrode 30 comprised a 1.5 mm thick silicon-doped 100-face gallium arsenide wafer, one side polished. After making an ohmic contact to the unpolished side, a 1 mil thick platinum disc, (counter electrode 32), was cemented thereto with silver epoxy. The semiconductor wafer was treated according to the procedure described in the article by B. A. Parkinson, A. Heller, and B. Miller, *Applied Physics Letters*, 33, 521 (1978). The electrolyte or redox couple solution of compartments 12, 13 comprised 0.8 M $Na_2Se$–0.1 M $Na_2Se_2$–1.0 M NaOH. A pump not shown in the figure was connected between tubes 60, 62 which communicate with compartments 12, 13 respectively. The pump circulated electrolyte solution between the compartments or a 0.1 ml/min rate. Owing to the configuration of window 50, the electrolyte layer between that window and photovoltaic electrode 30 was only 3 mm thick, to afford maximum optical transparency.

The cation semipermeable membranes 22, 26 and 28 were of the DuPont Nafion 417-9G-3009 type while anion-selective semipermeable membrane were of of the RAI Research Corp., Raipore 5035 type. Compartments 14, 15, 16 were filled with 0.06 M NaCl, a concentration typical of brackish water. The NaCl solution was run sequentially through the buffer compartment 16 and salt-enriched compartment 14 at a 1.0 ml/min rate. The photovoltaic electrode 30 was illuminated by collimated light from a 300 watt quartz halogen projector lamp having an intensity of 0.33 watts/cm$^2$. The experimental result is shown in FIG. 3., Curve 64 which plots the conductance of compartment 15 during the experiment.

Curve 66 of FIG. 3 indicates performance of a prior art arrangement of cell substantially similar to that described above, excpet that buffer compartment 16 and membrane 28 were deleted. Curve 64 indicates that a steady state of approximately 79% demineralization was reached in about seven hours. The desalted solution of compartment 15 was found to contain a suspended solid elemental selenium, indicating leakage of selenide anions across membrane 26. Since the photovoltage characteristic of photovoltaic member 20 is capable to carrying the demineralization substantially to completion, (with ideal membranes) the 21% residual steady state conductivity is a measure of selenium ion leakage through membrane 26. Most of the difference in performance between curves 64, 66 of FIG. 3 is attributed to the inclusion of buffer compartment 16. A minor part of the improved performance was realized by an improved method of preparing the redox couple where $H_2Se$ gas was bubbled through alkali hydroxide solutions, according to the paper by B. Miller, A. Heller, M. Robbins, S. Menezes, K. C. Chang, and J. Thomson, Jr., *Solar Energy*, 124, 1019 (1977). This technique avoided the problems associated with preparing a selenide solution from alkalai metal selenides, which are extremely air sensitive and which tend to increase the light absorption of the redox couple solution.

FIG. 3 also shows the results of three other experiments in which the buffer compartment was employed. In the third experiment, indicated by curve 68, the aforementioned membranes were replaced with cation, and anion-selective membranes obtained from Ben Gurion University of the Negev Applied Research Institute, as described in the paper by F. DeKorosy and J.

Shorr, *Bulletin of the Research Council of Israel,* 11A, 40 (1962).

In experiment four, the results of which are indicated in curve 70 of FIG. 3, the aforementioned photovoltaic member 20 was substituted for a thin film polycrystalline n-CdSe disc electrode obtained from the Weizmann Institute of Science, Israel, similar to the one described in the paper by G. Hodes, *Nature,* 285, 29 (1980). The electrode was deposited on a titanium disc substrate to which a brass counterelectrode was cemented with a silver epoxy.

In the fifth experiment, the redox solution was substituted for a 0.1 M $Na_2S$, 0.1 M $Na_2S_2$ solution. While not directly observed, it is reasonable to suspect that while the experiment of curve 72 was run, sulfide ions were leaking past membrane 28, but were prevented from entering the product water by buffer compartment 15. Thus, buffer compartment 15 can be seen to afford adequate protection against chalcogenide inleakage in the solvent product.

The embodiments of the invention in which an exclusive property or privilege is claimed are defined as follows:

1. In a multicompartment electrodialytic cell including a wet junction photo cell assembly having at least one electrolyte compartment, the electrodialytic cell further including a product compartment bounded by at least one membrane, said product compartment permitting a concentration of a product therein when energized by an electric field, an improved means for preventing contamination from entering said product compartment, said contamination being contained in said electrolyte compartment, comprising:

a buffer compartment interposed between and immediately adjoining said product compartment and said electrolyte compartment;

first and second semipermeable membranes, each permeable to ions of a first predetermined type and permeable also to said contamination, said first membrane disposed between said product and said buffer compartments, and said second membrane disposed between said buffer and said electrolyte compartments;

said electrolyte compartment is in electrochemical communication with said product and said buffer compartments; and means for flushing said buffer compartment to prevent said contamination from entering said product compartment.

2. The arrangement of claim 1 wherein said electrodialytic cell comprises a photoelectrodialytic desalination cell and said product and said buffer compartments are filled with salinated water of approximately equal salt concentrations.

* * * * *